United States Patent
Wang

[11] Patent Number: 6,098,291
[45] Date of Patent: Aug. 8, 2000

[54] PIPE CUTTER

[76] Inventor: Chung-Hung Wang, No. 14, Alley 405, Section 2 Hsin Ang Road, Taichung City, Taiwan

[21] Appl. No.: 09/266,359

[22] Filed: Mar. 11, 1999

[51] Int. Cl.$^7$ .................................................. B23D 21/06
[52] U.S. Cl. ................................................. 30/92; 30/190
[58] Field of Search ............................... 30/251, 250, 190, 30/189, 188, 92

[56] References Cited

U.S. PATENT DOCUMENTS

| | | | |
|---|---|---|---|
| 1,354,755 | 10/1920 | Hultman | 30/250 |
| 1,651,176 | 11/1927 | Bannon | 30/251 |
| 2,436,260 | 2/1948 | Klenk | 30/251 |
| 3,243,880 | 4/1966 | Weller | 30/250 |
| 4,094,064 | 6/1978 | Nishikawa et al. | 30/251 |
| 4,178,682 | 12/1979 | Sadauskas | 30/251 |
| 4,186,484 | 2/1980 | Tanaka | 30/251 |
| 4,599,795 | 7/1986 | Yokoyama | 30/188 |
| 4,674,184 | 6/1987 | Anderson | 30/92 |

FOREIGN PATENT DOCUMENTS

| | | | |
|---|---|---|---|
| 475057 | 7/1951 | Canada | 30/250 |
| 406320329 | 11/1994 | Japan | 30/92 |
| 35585 | 7/1906 | Switzerland | 30/250 |

*Primary Examiner*—Rinaldi I. Rada
*Assistant Examiner*—Omar Flores-Sánchez
*Attorney, Agent, or Firm*—Charles E. Baxley

[57] ABSTRACT

A pipe cutter includes a first handle and a second handle with a pivotable blade connected thereto which has teeth defined in a lateral side thereof. The second handle has a fixed jaw extending laterally therefrom to which the first handle is pivotally connected. A control member is pivotally connected to the first handle and has an initial pawl extend therefrom so as to engage with the teeth when the blade is not pivoted relative to the fixed jaw. The distal end of the control member has a pawls so as to engage with the teeth when the blade is pivoted toward the fixed jaw. A link mechanism is connected between the blade and the second handle so that when pushing the link mechanism by a cam device extending from the first handle, the blade is pivoted toward the fixed jaw to position a pipe to be cut between the fixed jaw and the blade.

6 Claims, 7 Drawing Sheets

PIPE CUTTER

FIELD OF THE INVENTION

The present invention relates to a pipe cutter, and more particularly, to an improved pipe cutter having a concise structure and the numbers of the teeth connected to the blade are reduced.

BACKGROUND OF THE INVENTION

A conventional pipe cutter is shown in FIG. 1 and comprises a blade 10 with a plurality of teeth 11 defined in the lower edge thereof so as to be engaged with a pawl member 13 connected to one of two handles 15, 15' of the pipe cutter. The handle 15 having the pawl member 13 has a fixed jaw 150 so that a pipe can be cut between the blade 10 and the fixed jaw 150. The other handle 15' ha a stop pawl 14 connected thereto so as to engage with the teeth and prevent the blade 10 form moving rearwardly when cutting the pipe. A spring 12 has one end thereof fixedly connected to the handle 15' and the other end thereof connected to the blade 10 so that when the teeth 11 of the blade 10 is not engaged with the pawl member 13 and the stop pawl 14, the blade 10 will be pivoted to its original position. The cutting movement of the blade 10 is operated by reciprocatingly operating the handle 15 to move the pawl member 13 to engage with the teeth one by one. This is time consuming job and the numbers of the teeth 11 are so many that the manufacturing cost for manufacturing the blade 10 together with the teeth 11 is high. Furthermore, when using the pipe cutter, the teeth 11 are exposed and the total width between the two handles 15, 15' of the pipe is so large that is inconvenient for use.

The present invention intends to provide a pipe cutter which has less numbers of teeth on the lower edge of the blade and a compact size. The pipe cutter improves the shortcomings of the conventional pipe cutter and reduces the manufacturing cost.

SUMMARY OF THE INVENTION

In accordance with one aspect of the present invention, there is provided a pipe cutter comprising a first handle having a cam means extending from the inside thereof, and a second handle having a blade pivotally connected thereto. A fixed jaw extends laterally from the second handle and the first end of the first handle is pivotally connected to the fixed jaw. A control member has the first end thereof pivotally connected to the first handle and an initial pawl extending therefrom. A first pawl and a second pawl respectively extend from two opposite sides of the second end of the control member. The second handle has a recess defined in the second end thereof for receiving a spring therein. The blade has a plurality of teeth defined in a lateral side thereof, the teeth engaged with the initial pawl when the pipe cutter is not operated. The teeth are engaged with the first pawl when the blade is pivoted toward the fixed jaw.

A first link has the first end thereof located between the first handle and the second handle, and the second end of the first link is pivotally connected to the blade. A second link has the first end thereof pivotally connected to the first end of the first link and the second end of the second link contacts the spring in the recess of the second handle.

The object of the present invention is to provide a pipe cutter having a compact size and the size of the blade is smaller than the conventional pipe cutter.

Another object of the present invention is to provide a pipe cutter having a link mechanism connected between the blade and the two handles so that the operation of the pipe cutter is simply pushing the handles toward with each other.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
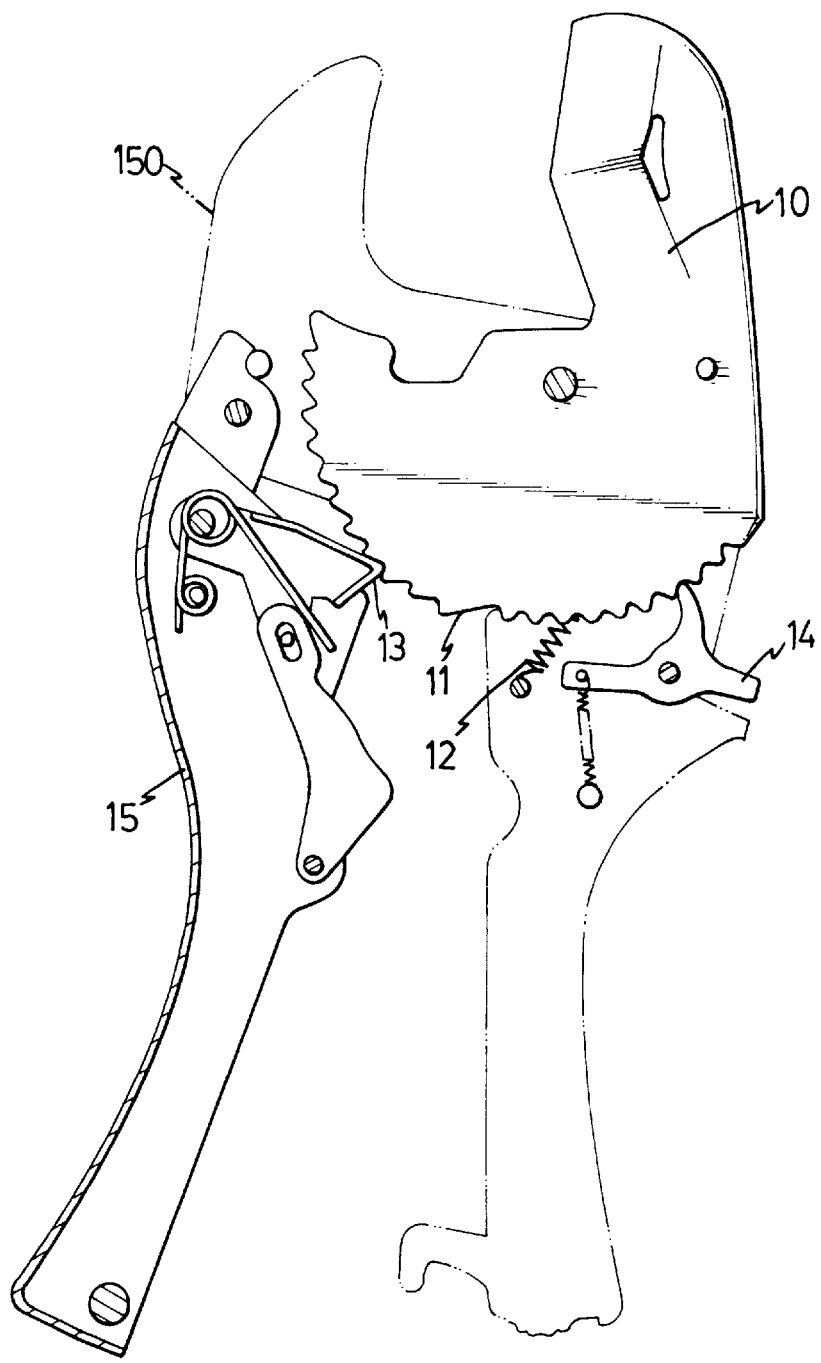
FIG. 1 is a side elevational view, partly in section, of the conventional pipe cutter.
Figure 2:
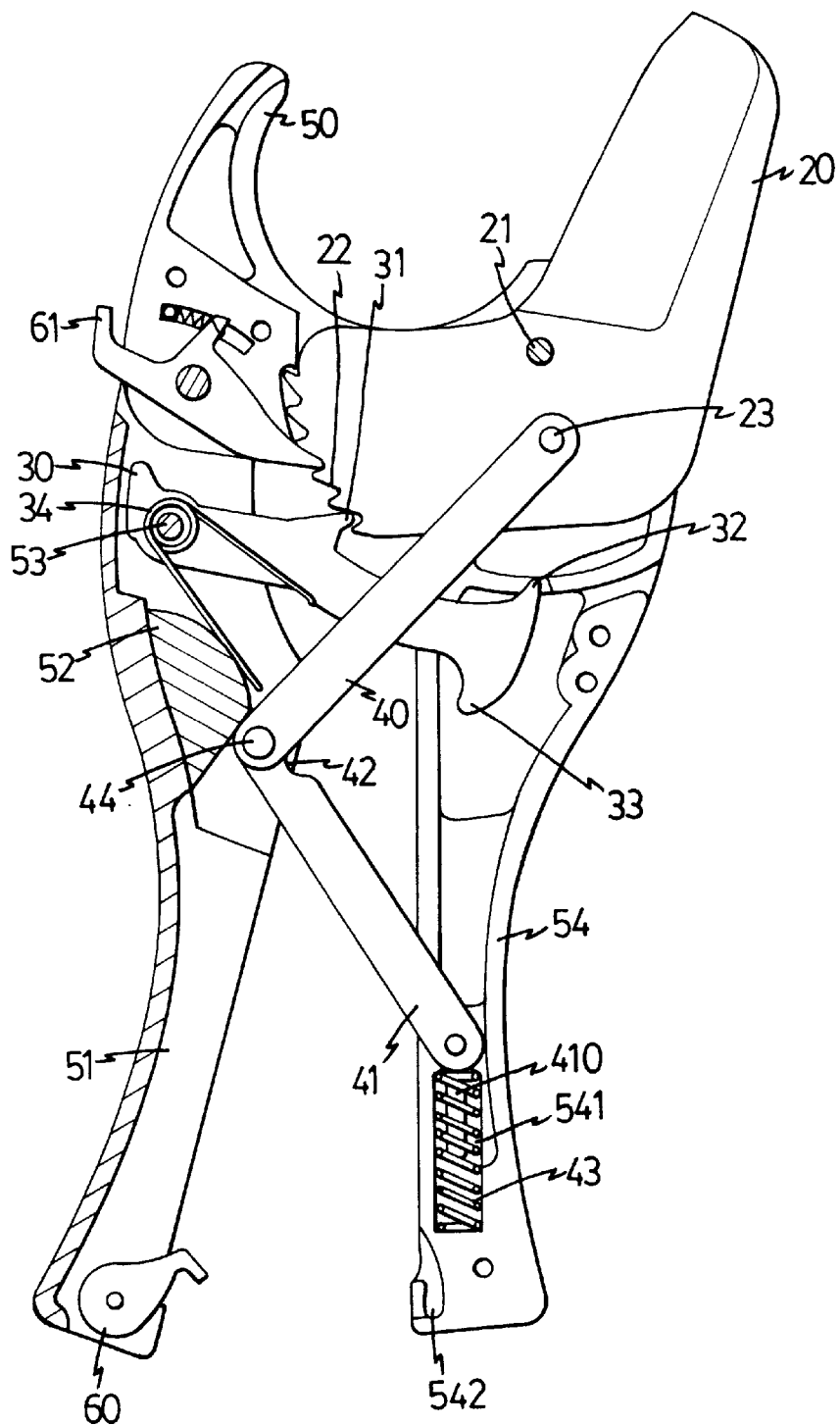
FIG. 2 is a side elevational view, partly in section, of the pipe cutter in accordance with the present invention.
Figure 3:
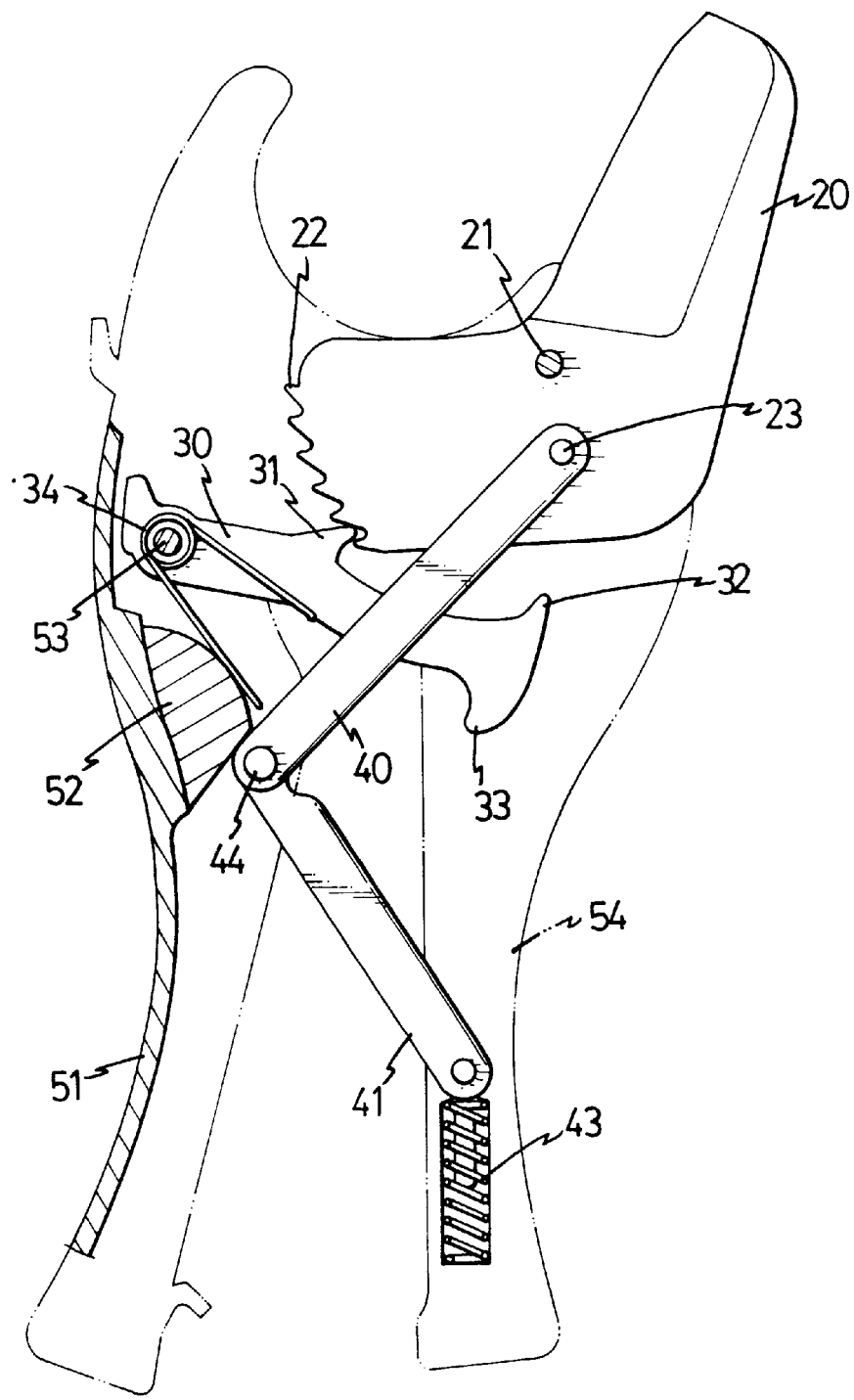
FIG. 3 is a view similar to FIG. 2 wherein some parts of the pipe cutter are not show for illustrative purpose.
Figure 5:
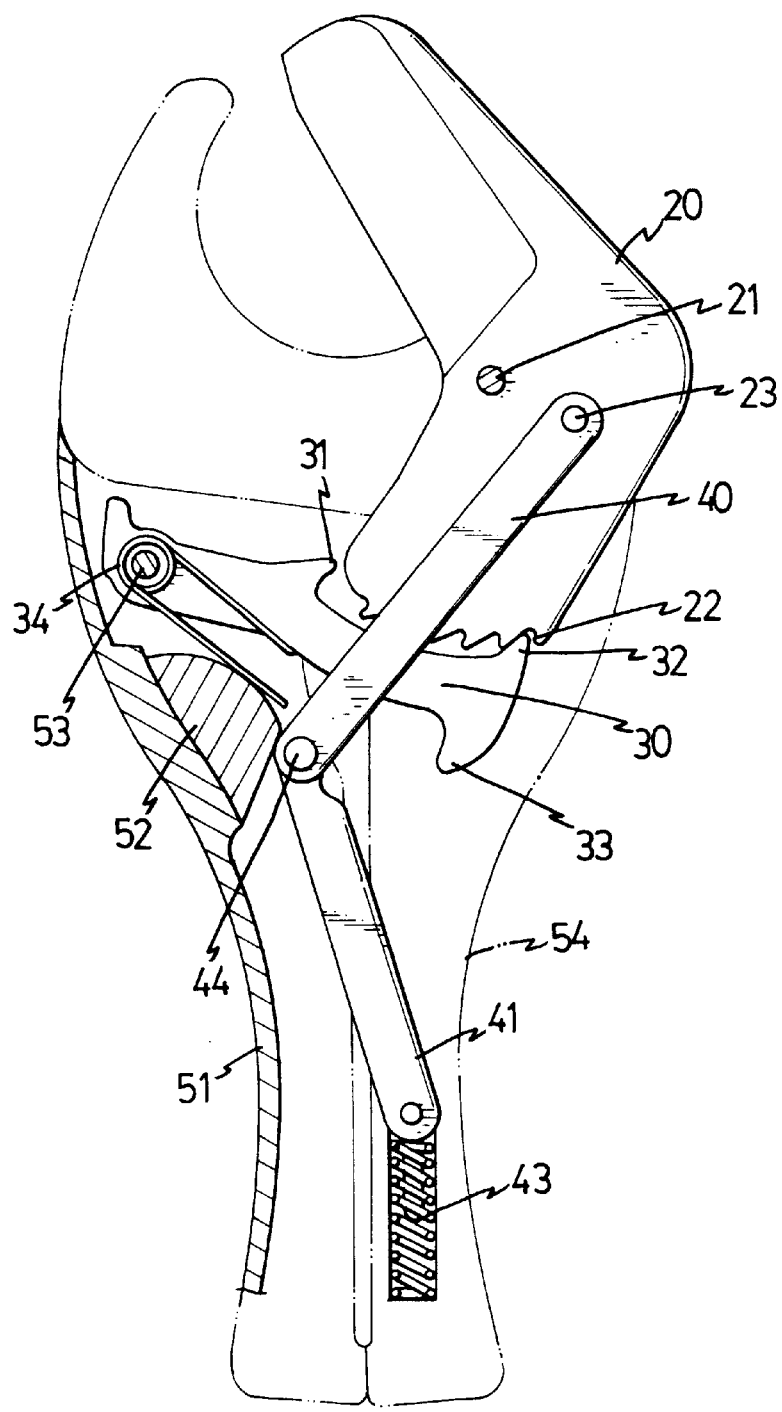
FIG. 5 is a side elevational view, partly in section, of the pipe cutter in accordance with the present invention wherein after the tow handles are pushed together, the spring push the second link to pivot the blade toward the fixed jaw.

Referring to FIGS. 2 and 3, the pipe cutter in accordance with the present invention comprises a first handle 51 having a cam means 52 extending from the inside thereof. A second handle 54 has a blade 20 pivotally connected to the first end thereof by a pin 21 and a fixed jaw 50 extends laterally from the first end of the second handle 54. The first end of the first handle 51 is pivotally connected to the fixed jaw 50. The blade 20 has a plurality of teeth 22 defined in a lateral side thereof. The second handle 54 has a recess 541 defined in the second end thereof for receiving a spring 43 therein and a concavity 542 defined in the second end thereof so as to receive a hook 60 connected to the second end of the first handle 51 when the two handles 51, 54 are pushed together for convenience of storage. A control member 30 has the first end thereof pivotally connected to the first handle 51. An initial pawl 31 extends from the control member 30 and a first pawl 32 and a second pawl 33 respectively extend from two opposite sides of the second end of the control member 30. One of the teeth 22 is engaged with the initial pawl 31 when the first handle 51 and the second handle 54 are not pushed toward with each other. The teeth 22 are engaged with the first pawl 32 when the blade 20 is pivoted toward the fixed jaw 50 as shown in FIG. 5. A torsion spring 34 is mounted the pin 53 to which the control member 30 is pivotally connected to the first handle 51. One leg of the torsion spring 34 is engaged with the cam means 52 and the other leg is engaged with the control member 30. A plate 61 is further pivotally connected to the fixed jaw 50 and one end of the plate 61 is engaged with the teeth 22 when the pipe cutter is not operated as shown in FIG. 2 to securely position the blade 20.

A first link 40 has the first end thereof located between the first handle 51 and the second handle 54, the second end of the first link 40 is pivotally connected to the blade 20 at the position 23. A second link 41 has the first end thereof pivotally connected to the first end of the first link 40 at the position 44 and the second end of the second link 41 has a rod 410 engaged with the spring 43 in the recess 541 so that the second end of the second link 41 can be moved with in the recess 541 in the second handle 54. The cam means 52 on the first handle 51 is located beside the pivotal connection position 44 of the first end of the first link 40 and the first end of the second link 41.

Figure 4:
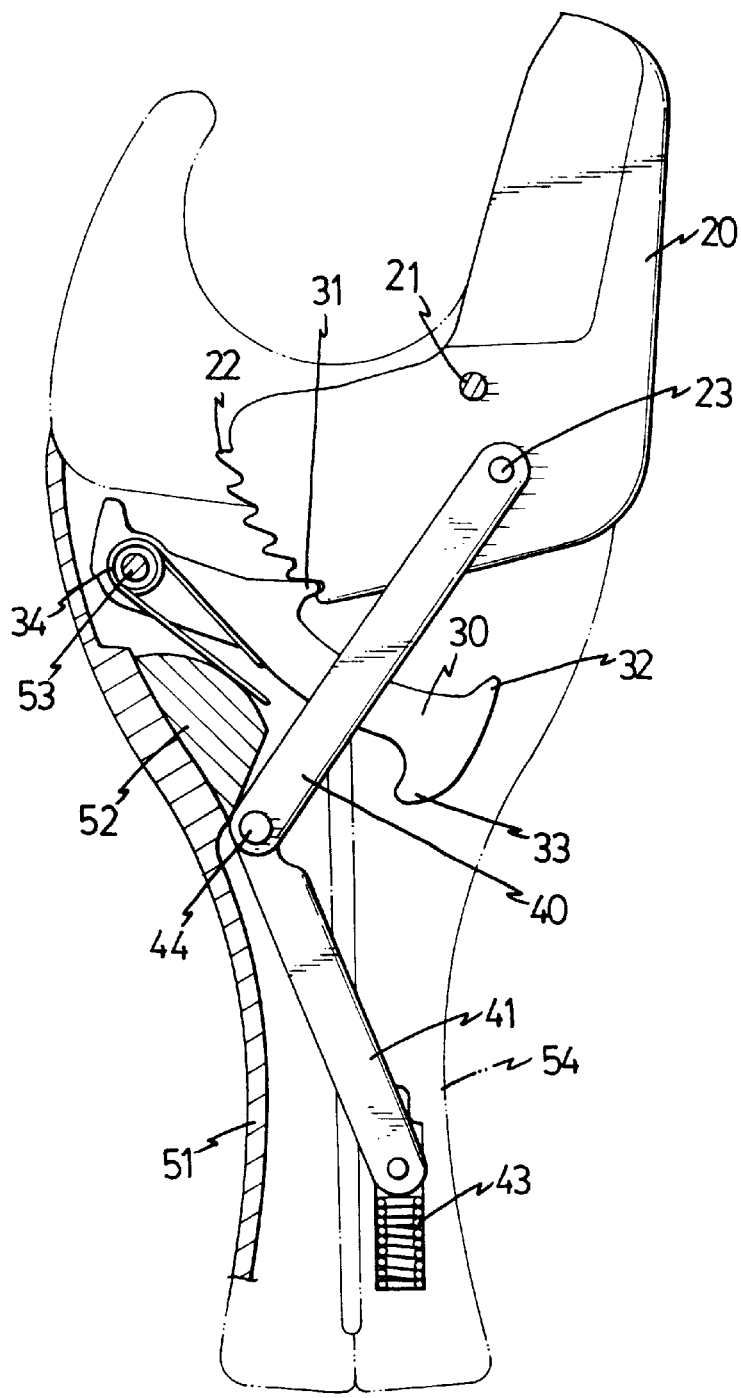
FIG. 4 is a side elevational view, partly in section, of the pipe cutter in accordance with the present invention wherein the two handles are pushed together.
Figure 6:
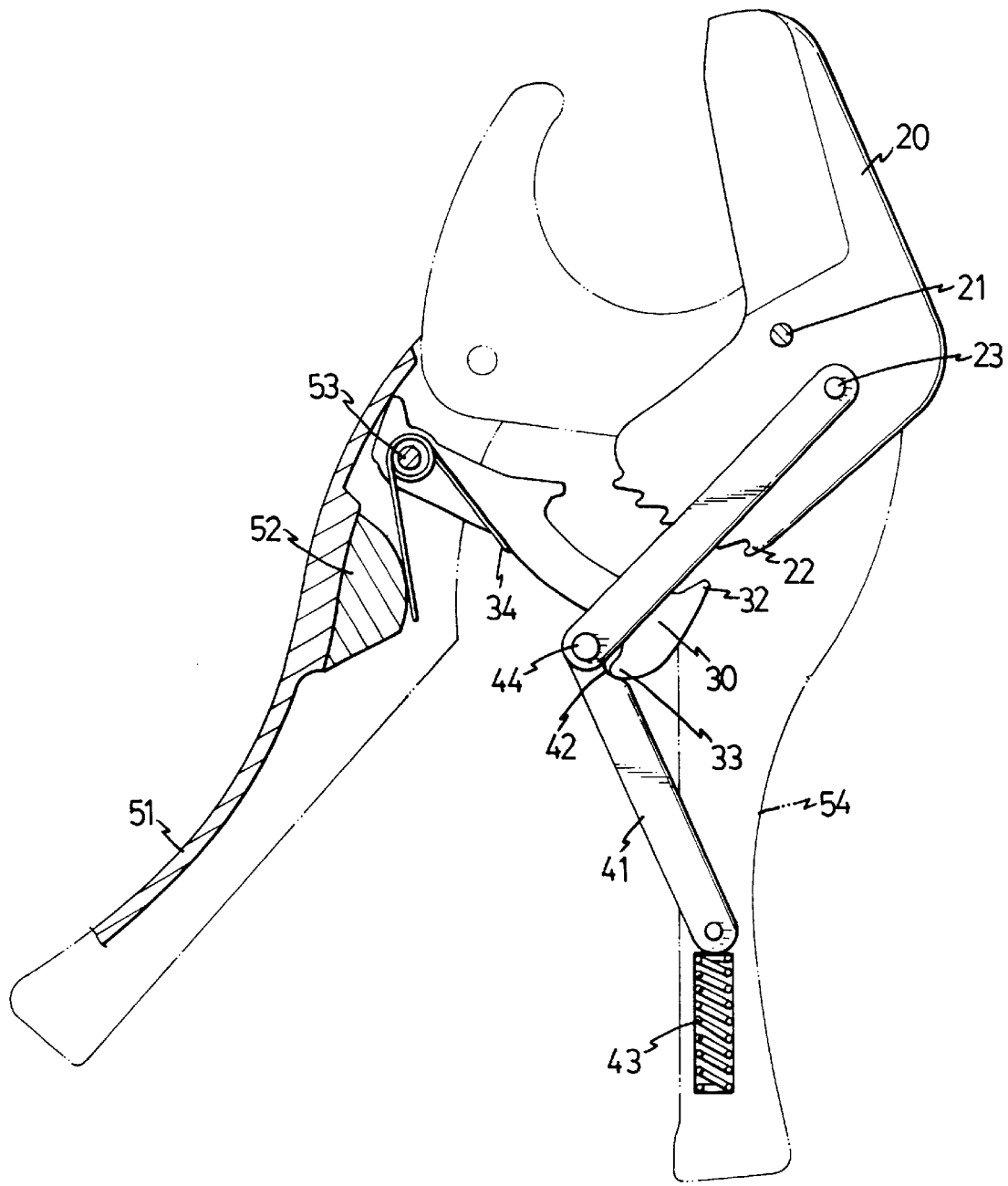
FIG. 6 is a side elevational view, partly in section, of the pipe cutter in accordance with the present invention wherein the first handle is opened away from the second handle.
Figure 7:
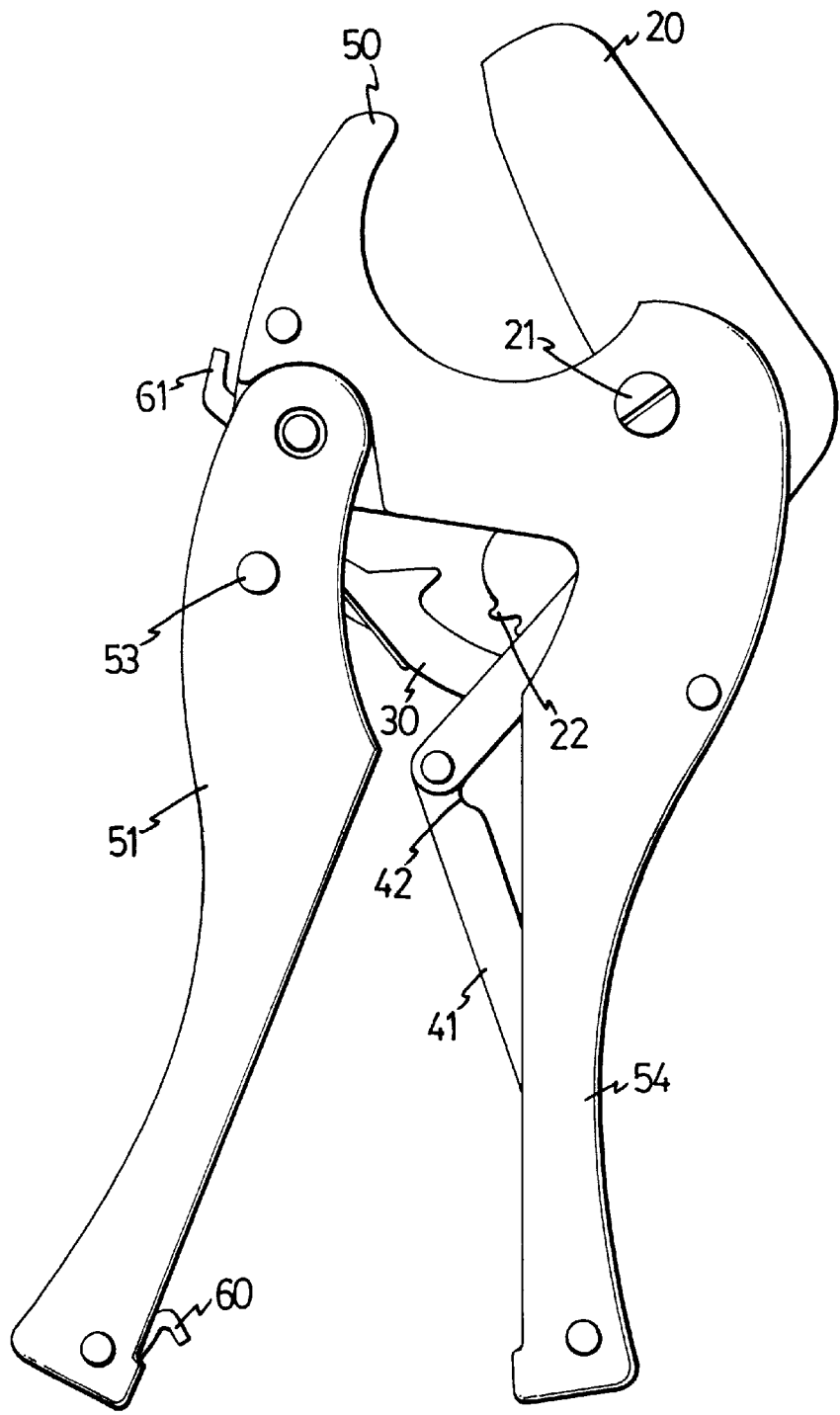
FIG. 7 is a side elevational view to show only few teeth are exposed during operating the pipe cutter in accordance with the present invention.

Referring to FIGS. 4 and 5, when using the pipe cutter, the first handle 51 is pushed toward the second handle 54, the connection position 44 is pushed by the cam means 52 so that the second end of the second link 41 compress the spring 43. When the cam means 52 moves over the connection position 44 and the two handles 51, 54 are together with each other, the spring 43 pushes the second end of the second link 41 to lift the position 23 relative to the pin 21 so as to pivot the blade 20 about the pin 21 to move toward the fixed jaw 50 as shown in FIG. 5. At the position, the teeth 22 are moved to be engaged with the first pawl 32 and the pipe cutter can be operated as the procedures when operating the conventional pipe cutter. Very few teeth 22 are exposed as shown in FIG. 7. Referring to FIG. 6, the second link 41 has a notch 42 defined in the first end thereof for being engaged with the second pawl 33. In other words, when pulling the first handle 51 wide away from the second handle 54, the second pawl 33 is engaged with the notch 42 and the blade 20 returns to its original position ready for the next cutting operation.

The present invention effectively reduces the size of the blade 20 and the numbers of the teeth 22 of the blade 20 can be reduced. During the operation, because the numbers of the teeth 22 are less than those of the conventional pipe cutter, teeth 22 are not exposed.

While we have shown and described various embodiments in accordance with the present invention, it should be clear to those skilled in the art that further embodiments may be made without departing from the scope and spirit of the present invention.

What is claimed is:

1. A pipe cutter comprising:

a first handle having a cam means extending from a inside thereof, a control member having a first end thereof pivotally connected to said first handle and an initial pawl extending from said control member, a first pawl and a second pawl respectively extending from two opposite sides of a second end of said control member;

a second handle having a blade pivotally connected to a first end thereof and a fixed jaw extending laterally from said first end of said second handle, said first handle having said first end thereof pivotally connected to said fixed jaw, said blade having a plurality of teeth defined in a lateral side thereof, said teeth engaged with said initial pawl when said first handle and said second handle are not pushed toward with each other, said teeth engaged with said first pawl when said blade is pivoted toward said fixed jaw, and a first link having a first end thereof located between said first handle and said second handle, a second end of said first link pivotally connected to said blade, a second link having a first end thereof pivotally connected to said first end of said first link and a second end of said second link movably connected to said second handle.

2. The pipe cutter as claimed in claim 1, wherein said second link has a notch defined therein for being engaged with said second pawl.

3. The pipe cutter as claimed in claim 1, wherein said second handle has a recess defined in a second end thereof for receiving a spring therein and said second end of said second link contacts said spring so as to be moved along said recess of said second handle.

4. The pipe cutter as claimed in claim 1, wherein said first handle has a hook connected to a second end thereof and said second handle has a concavity defined in a second end thereof so as to receive said hook.

5. The pipe cutter as claimed in claim 1 further comprising a plate pivotally connected to said fixed jaw and one end of said plate is engaged with the teeth.

6. The pipe cutter as claimed in claim 1, wherein said cam means is located beside said first end of said first link.

* * * * *